Dec. 15, 1936.   H. L. RORDEN   2,064,630

IMPULSE GENERATOR

Filed Aug. 7, 1935

INVENTOR
Harold L. Rorden.
BY
ATTORNEY

Patented Dec. 15, 1936

2,064,630

UNITED STATES PATENT OFFICE 2,064,630

IMPULSE GENERATOR

Harold L. Rorden, Barberton, Ohio, assignor to The Ohio Brass Company, Mansfield, Ohio, a corporation of New Jersey Application August 7, 1935, Serial No. 35,136

22 Claims. (Cl. 171—97)

This invention relates to impulse generators for producing high voltage impulses, and has for one of its objects the provisions of an impulse generator circuit in which the voltages produced can be accurately controlled and evaluated and accurately reproduced in successive operations of the generator when so desired.

A further object of the invention is to provide an improved connection between an impulse or surge generator and a cathode rail oscillograph by which the oscillograph is synchronized with the generator and the negative impulse which charges the cathode of the oscillograph, simultaneously produces a series discharge of the generator, irrespective of the polarity of the charge in the generator.

A further object of the invention is to provide an improved circuit for an impulse generator in which the charging transformer for the capacitors need be insulated for the voltage of one capacitor unit only although the capacitor units of the generator are charged in pairs, the units of each paid being in series.

A further object of the invention is to provide means for automatically shifting the ground connection of the circuit to a different point during discharge from the point where the circuit is grounded during the charging of the capacitors.

A further object of the invention is to provide automatic means for accurately timing and determining the sequence of the various operations in charging and discharging the impulse generator.

A further object of the invention is to provide an impulse generator and circuit therefor which shall have a maximum factor of convenience and safety.

A further object of the invention is to provide an impulse generator and circuit therefor which shall be of improved construction and operation.

Other objects and advantages will appear from the following description.

The invention is exemplified by the combination and arrangement of parts shown in the accompanying drawing and described in the following specification, and it is more particularly pointed out in the appended claims.

Figure 1:
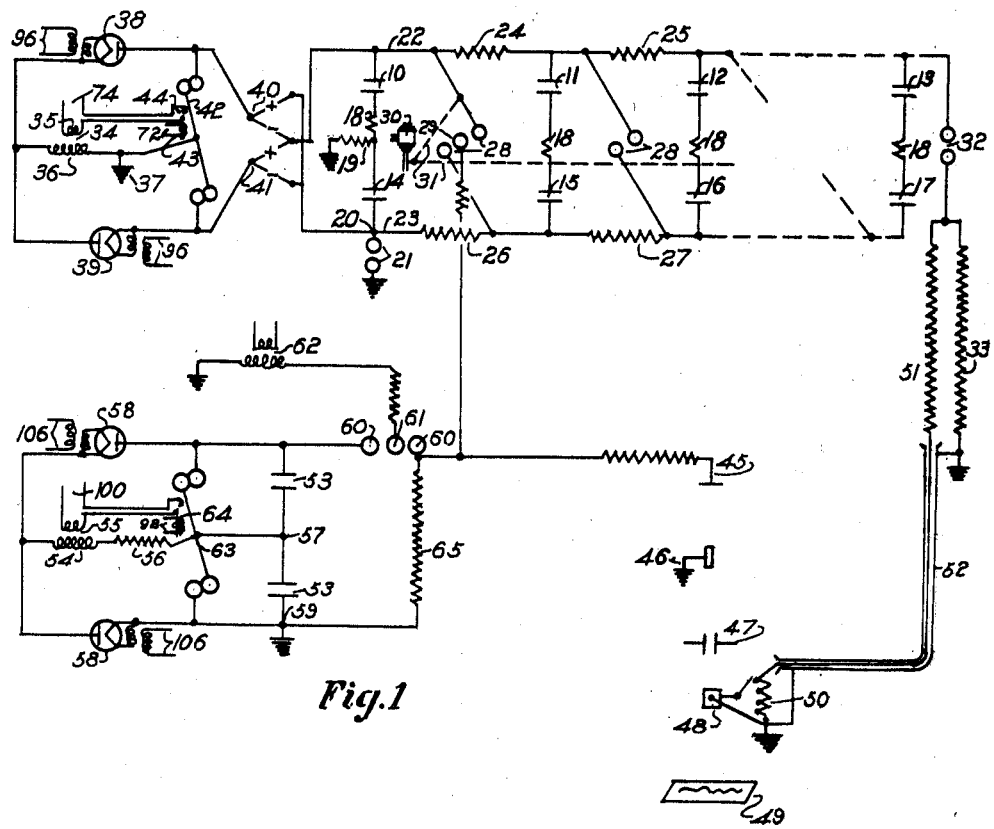
Fig. 1 is a circuit diagram showing the connections of the impulse generator, its charging set and the oscillograph and its charging set for recording the characteristics of the waves produced by the generator.

In Fig. 1 of the drawing, the numerals 10, 11, 12, 13, 14, 15, 16, and 17 represent the capacitors of an impulse generator. The impulse generator may be and preferably is of the general type shown in Patent No. 1,997,064, granted April 9, 1935, to J. T. Lusignan, Jr. It will be understood, however, that the present invention may be applied to various forms of impulse generators and it will also be understood that the number of capacitors connected as shown in the diagram may be extended to include the requisite number to give the desired voltage, and each of the capacitor units indicated by the above reference characters in fact include a large number of separate capacitors connected in series or in any suitable combination of series and parallel connections. The capacitor units are arranged in pairs connected in series, as shown in the diagram, and impedances 18 are arranged in the circuit of each pair. These impedances may be varied as found desirable to control certain characteristics of the wave of the generated impulse. The first pair of capacitors 10 and 14 are grounded through an impedance 19 at a point between the two capacitors.

Heretofore it has been customary to ground the endmost terminal of the series of capacitors at the point 20 but according to the present invention, a sphere gap 21 is connected between the point 20 and ground for reasons which will be more fully explained. The several pairs of capacitors are connected in multiple by conductors 22 and 23, and impedances 24, 25, 26, 27, etc. are connected in the conductors between the terminals of the various pairs of capacitors. One terminal of each pair is connected to the opposite terminal of the next adjacent pair through sphere gaps 28. The first of these gaps is more widely separated than the other gaps and a supplemental or starting electrode 29 is interposed between the two spheres 28. Any suitable operating mechanism, such as a motor 30 and connecting levers 31, may be employed for adjusting the spacing of the gaps 28. This operating mechanism is preferably arranged for simultaneous adjustment of all of the gaps from a distance, as more fully explained in Patent No. 1,997,064 referred to above.

The end of the conductor 22 is connected through a gap 32 and an impedance 33 to ground. The impedance 33 may be of sufficient value to apply substantially the total voltage generated upon a test piece connected in parallel with the impedance. In some cases, it may be desirable to substitute the test piece for the impedance 33.

The circuit for charging the generator includes a transformer 34 having a primary winding 35 and a secondary winding 36. One end of the secondary winding 36 is grounded at 37. The other end of the secondary winding 36 is connected through thermionic valves 38 and 39 to the terminals 40 and 41 respectively of a reversing switch so arranged that the terminals of the thermionic valves may be selectively connected to the conductors 22 and 23. The valves 38 and 39 are arranged in reverse order in their circuits so as to produce a full wave rectifier for charging the pairs of capacitors of the impulse generator with the conductor 22 either positive or negative with respect to ground as desired so as to impress either a positive or negative impulse on the test piece in parallel with the impedance 33. The switch terminals 40 and 41 may be short circuited by a discharge switch 42 which is biased to a closed position but which is opened to permit charging of the impulse generator when the relay 43 is energized. The switch 42 is preferably biased to close automatically as soon as the relay 43 is de-energized. The relay 43 also controls the circuit of the primary winding 35 of the transformer 34 as indicated by the terminals 44. The terminals 44 are connected so as to complete the circuit for the primary 35 at the same time that the discharge switch 42 is open.

It will be seen that by this arrangement, the several pairs of capacitors will be charged in parallel and may be discharged in series by inducing an arc across the first of the series of gaps 28. This will add the voltage of the first pair of capacitors to that of the second pair and impress the combined voltage on the second gap 28. By this operation, all of the gaps are caused to arc and the capacitors will then be connected in series by the arcs thus formed, and the parallel connections through the conductors 22 and 23 will be practically blocked, so far as the impulse is concerned, by the impedances 24, 25, 26 and 27. The speed at which the impulse is built up and consequently the wave front will be determined by the impedances 18 in series with the capacitors. Substantially the total voltage of the capacitors in series will be impressed upon the impedance 33 and the tail of the wave will be determined by the character of the impedance 33. During the discharge of the generator, the series of capacitors will be effectively grounded at the point 20 by the arc caused to bridge the gap 21 so that all of the capacitors will be effectively connected in series. The impedance 19 will practically block the connection to ground at this point for the impulse. By the arrangement shown, the capacitors of the pairs are charged singly, due to the ground connection through the impedance 19, so that the secondary winding 36 is subjected only to voltage to ground equal to the voltage necessary to charge a single capacitor while if the ground were permanently connected at 21, the secondary 36 of the transformer would be required to withstand a sufficient voltage to charge the two capacitors of the pairs in series. When the generator discharges, however, the ground is automatically shifted to the point 20, by the arc at this point, so that all of the capacitors are connected in series and the total impulse voltage generated is above ground potential.

The impedances 19, 24, 25, 26, 27, etc., may comprise resistance alone or may include inductance and they should be great enough to give to the various local circuits of which each is a part a time constant at least ten times that of the main series discharge circuit. It has been found in practice that with this relative value of the time constants of the circuits, practically all of the energy of the discharge impulse will be expended in the main series discharge circuit containing the test piece and the loss in the local circuits will be immaterial. The gap 21 should be as great or slightly greater than the gap between the starting terminal 29 and either of the cooperating terminals 28.

The characteristics of the impulse wave are recorded by a cathode ray oscillograph, the elements of which are diagrammatically illustrated in the drawing; the cathode being designated by the numeral 45; the anode by the numeral 46; the time deflector plates by the numeral 47; the surge deflector plates by the numeral 48; the photographic film by the numeral 49, and the adjustable impedance for controlling the voltage on the surge deflector plates by the numeral 50. The impedance 50 is connected in a circuit arranged in parallel with the impedance 33. This circuit includes a high resistance 51 and a capacitance 52 in the form of a cable having a grounded sheath through which the lead-in conductor passes. By adjusting the impedance 50, the surge deflector plates can be subjected to a suitable proportion of the surge voltage so as to deflect the cathode ray and record the characteristics of the impulse, on the film 49, in a well known manner.

The cathode 45 is charged by means of two capacitors 53 connected in series and having the secondary 54 of a transformer 55 connected through an impedance 56 to the adjacent terminals of the capacitors at 57. The other terminals of the capacitors are connected through thermionic valves 58 to the opposite terminal of the secondary 54. This arrangement as will be clearly seen, provides a full wave rectifier for charging the capacitors 53 in series, the arrangement being such that the grounded point 59 of the capacitors will be positive. The two terminals of the pair of capacitors are connected to the terminals 60 of a sphere gap, between which a third sphere 61 is interposed. A transformer 62 is provided for impressing voltage on the sphere 61. A discharge switch 63 is provided for short-circuiting the capacitors 53 when not in use; the switch being controlled by a relay 64 which also controls the primary circuit of the transformer 55. When a positive charge is impressed on the sphere 61, it will of course increase the voltage difference between that sphere and the terminal sphere of the gap which is at negative polarity and this will cause a breakdown of the gap, completing the circuit of the two capacitors 53 through the resistance 65. The resistance 65 is of such value that a drop in voltage across the resistance will constitute the major portion of the voltage of the capacitors 53. Since the point 59 is grounded, this will place a negative potential on the terminal 60 connected to the cathode 45, substantially equal to the voltage of the two capacitors 53. Since this sphere 60 is connected to the sphere 29 of the end gap 28 of the impulse generator, the potential between the sphere 29 and the positive sphere of the gap 28 will be increased, thus precipitating discharge of the impulse generator. It will be immaterial which of the spheres 28 is positive because when one-half of the gap is broken down, the total voltage will be applied to the other half and cause the entire gap to go. With the arrangement shown, it always possible to trip the impulse generator by the negative potential of the cathode ray circuit. This would not be possible if the point 20 were grounded.

Where one of the spheres 28 is positive and the other negative with respect to ground, as is the case with the point between the capacitors 10 and 14 grounded, then when a negative potential is impressed upon the sphere 29 the potential difference between that sphere and the positive sphere 28 will be increased so as to break down the gap between them and precipitate discharge. Where one of the spheres 28 is at ground potential and the other is at a negative potential equal to the voltage of the two capacitors, then the impression of a negative potential on the sphere 29 will produce only a voltage difference between the grounded sphere and the sphere 29 equal to the voltage of the two capacitors 53, which is insufficient to break down the gap, and will bring the sphere 29 to a potential of the same polarity as the negative sphere 28, which of course will not cause the other side of the gap to break. This difficulty is not encountered when one sphere 28 is grounded and the other positive; but it is desirable to trip the impulse generator by the negative potential of the cathode ray oscillograph irrespective of the polarity of the charge generated by the impulse generator. This operation for both polarities of charge is made possible according to the present invention by grounding the mid point between the capacitors 10 and 14 and inserting the gap 21 between the point 20 and ground. In this way, the discharge of the oscillograph capacitors and the discharge of the surge generator can be synchronized so that the oscillograph will always record the characteristics of the impulse from the generator.

In the operation of the generator set, it is very important that the various steps be properly timed and that they take place in the proper sequence, and also that the apparatus be so controlled as to involve as little danger as possible to the operators. Generators may be designed to generate impulses of 3,000,000 or more volts. Of course with a voltage of this kind, it is necessary to take every safety precaution possible. The control mechanism shown in Figs. 2 and 3 secures the proper sequence and timing and also imparts a maximum degree of safety to the operation of the set.

The necessary energy for charging the capacitors of the generator may be supplied from any suitable source, such as a motor generator 66. This generator is provided with a switch 67 and its circuit is controlled by a relay 68. Other parts of the set are supplied with current from bus conductors 69 connected by a switch 70 to any suitable source of alternating current supply which may be a regular 120 volt, 60 cycle circuit. A switch panel 71 is provided with switches for connecting the bus conductors 69 to the various circuits in the apparatus. Each of these circuits, where they appear in both Figs. 1 and 2, have been given the same number in both figures and it will be understood that the circuit of any given number on Fig. 1 is a combination of the circuit of the same number on Fig. 2.

Circuit 72 is connected to the relay 43 so that when switch 73 in this circuit is closed, the discharge switch 42 will be opened and the contact 44 in the primary circuit of the transformer 34 will be closed. This primary circuit is shown at 74 and is energized from the motor generator 66 and controlled by switch 67 and relay 68, as previously explained. The winding of the relay 68 is connected by circuit 75 through switch 76 to the bus conductors 69. One of the conductors of the circuit 75 is provided with a make and break contact 77 controlled by a cam 78 on a shaft 79 driven by a timing motor 80. The motor 80 is shown as a self starting synchronous clock motor connected by circuit 81 and switch 82 to the bus conductors 69. Any other form of clock mechanism may be employed for driving the motor 80 but a synchronous motor is found well adapted for this purpose. An alarm circuit 83 which controls a bell or other suitable alarm device is connected to the conductors 69 by switch 84 and is controlled by a cam 85 on the shaft 79. A circuit 86 is connected by a switch 87 to the bus conductors 69 and through relay contacts 88 and the circuit 89 to the primary of the transformer 62 which trips the discharge gap for the cathode and consequently discharges the impulse generator. The contact points 88 are controlled by a relay winding 90 which in turn is controlled by a cam 91 on the shaft 79.

The circuit 89 may be provided with a shunt path 92 which leads through a switch 93 and conductors 94 which are connected to a camera and arranged to open the shutter of the camera at the same time that the generator discharges so as to synchronize the camera with the discharge of the generator and secure an exposure showing the discharge flash. The camera may also be connected directly to the bus conductor 69 for operation at the will of the operator.

A circuit 95 is provided for operating the time deflector plates 47 of the oscillograph. The circuit 96 controlled by switch 97 is connected with the heating elements of the thermionic valves 38 and 39. A circuit 98 controlled by a switch 99 energizes the winding of the relay 64. The same switch 99 also controls circuit 100 which supplies the primary winding of the transformer 55 for charging the capacitors of the cathode ray oscillograph. The circuit 100 is provided with a control relay winding 101, which winding is controlled by cam 102 on the shaft 79. Circuit 103 energizes the time axis filament for the oscillograph and circuit 104 operates the vacuum pump 105 for the oscillograph. Circuit 106 operates the oscillator 107 for supplying the time reference curve for the oscillograph. Circuit 108 supplies current for the heating elements for the thermionic valves 58. A separate three-phase circuit 109 is illustrated for operating the molecular pump 110 for the oscillograph.

Figures 2, 3:
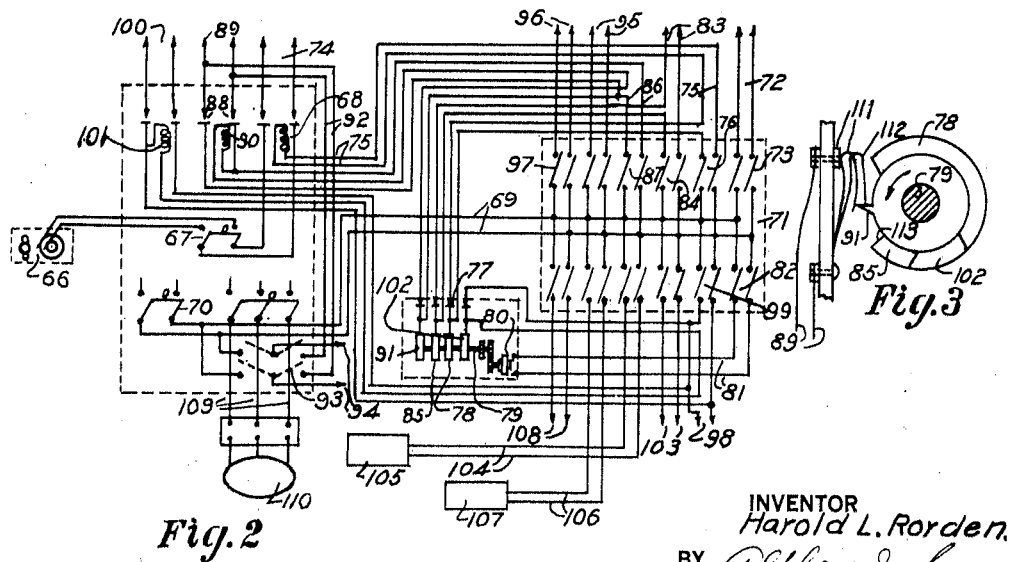
Fig. 2 is a circuit diagram showing the source of supply and control mechanism for the impulse generator and oscillograph.
Fig. 3 is a somewhat diagrammatic elevation of the control cams and switches for the generator set.

The timing cams are shown in elevation in Fig. 3 in which the contact members 111 for controlling the circuit 89 are shown closed by the cam 91. The other contact members as indicated by the numeral 112 are shown as open. The cam 78 which controls the circuit 74 connected with the primary 35 of the transformer 34 for charging the capacitors of the impulse generator is the longest cam of the set and extends around the major portion of the periphery of the cam disc. The cam 102 which controls the primary of the transformer 55 for charging the capacitors for the oscillograph is the second longest cam and the cam 85 is the third longest. The cams 78, 102 and 85 all terminate at the same peripheral point 113. The cam 91 is merely a point on the periphery of its disc for closing the firing circuits instantaneously. It will be seen that immediately after any discharge of the impulse generator induced by closing of the circuit 89 by the cam 91, the cam 78 will again close the circuit 74 to its relay 68 and start charging the capacitors of the impulse generator for the next operation. It will require several seconds to charge these capacitors so that their charging circuit is kept closed during a major portion of a revolution of the shaft 79. After something over a half revolution, the cam 72 will come into operation and impress a charging voltage on the capacitors of the cathode ray oscillograph. After the capacitors have been charging for some time and slightly before the operation of the cam 91 to produce discharge, the cam 85 closes the alarm circuit and sounds the alarm so that the operators may all be aware that a discharge is about to take place, and if they are in dangerous proximity to the generator they will be warned of the danger. After the capacitors are charged to the desired voltage, the contacts will drop from the cams 78 and 102 and give a slight period for the charges to be equalized in the various capacitors. At the end of this period, the cam 91 will close its circuit 89 and effect discharge of the generator in the manner previously described. This completes the cycle of operation which may be repeated as many times as desired. Since the cams are rotated at a uniform speed and since the voltage of the impulse depends upon the voltage of the charging circuit and the time that it is applied, the voltage of the impulse can be accurately regulated and can be accurately repeated as many times as desired.

The amount of this voltage may be controlled in either one of two ways. By changing the speed of rotation of the cam shaft 79, the charging voltage may be applied to the condensers for various periods of time so as to bring the voltage of the condensers to any desired amount approaching the charging voltage. The quantity of electricity accumulated in the capacitors and consequently the voltage of the capacitors depends not only upon the time but also upon the charging voltage. Consequently, the final voltage of the impulse generator may also be controlled by regulating the charging voltage. This may be conveniently done by adjusting the field of the generator 66.

It is of utmost importance in testing various apparatus that exactly the same voltage be applied to the apparatus for a number of successive tests. The timing cams therefore not only insure the proper sequence of operation for various parts of the set but also make it possible to determine accurately the conditions produced in the impulse generator and accurately to repeat any given set of conditions as many times as desired.

I claim:

1. The combination with an impulse generator of the type having a plurality of groups of capacitor units, means for charging said groups of units in parallel and a series discharge circuit for said units having a starting gap and a starting electrode spaced between the terminals of said gap for precipitating discharge of said units, of means including a ground connection between the units of one of said groups for insuring discharge of said starting gap irrespective of the polarity of the charge of said groups of units when a negative charge of proper amount is impressed on said starting electrode, a cathode ray oscillograph for detecting the character of discharge impulse from said generator, the cathode of said oscillograph being connected with said starting electrode to precipitate discharge of said generator when said cathode is charged, means for charging said cathode, and a timing switch for controlling the charging of the capacitors of said generator and for synchronizing therewith the charging of said cathode to effect discharge of said generator capacitors.

2. The combination with an impulse generator of the type having a plurality of groups of capacitor units, means for charging said groups of units in parallel and a series discharge circuit for said units having a starting gap and a starting electrode spaced between the terminals of said gap for precipitating discharge of said units, of means including a ground connection between the units of one of said groups for insuring discharge of said starting gap irrespective of the polarity of the charge of said groups of units, when a negative charge of proper amount is impressed on said starting electrode, a cathode ray oscillograph for detecting the character of the discharge impulse from said generator, the cathode of said oscillograph being connected with said starting electrode to precipitate discharge of said generator when said cathode is charged, a capacitor for charging said cathode and a timing switch for controlling and synchronizing the time of charging of the capacitors of said generator and said cathode charging capacitor and for synchronizing the charging of said cathode by its capacitor with the charging of said impulse generator capacitors, said timing switch being arranged to effect accurate repetitions of the cycles of operations controlled thereby.

3. The combination with an impulse generator of the type having a plurality of groups of capacitor units, means for charging said groups of units in parallel and a series discharge circuit for said units having a starting gap and a starting electrode spaced between the terminals of said gap for precipitating discharge of said units, of means including a ground connection between the units of one of said groups for insuring discharge of said starting gap, irrespective of the polarity of the charge of said groups of units, when a negative charge of proper amount is imposed upon said starting electrode, an impedance in said ground connection and an arcing gap to ground between the endmost terminal of said series of condensers and ground for shifting the ground connection when series discharge takes place, a cathode ray oscillograph for detecting the character of discharge impulse from said generator, the cathode of said oscillograph being connected with said charging electrode for precipitating discharge of said generator simultaneously with the charging of said cathode, a pair of capacitor units for charging said cathode, means including a starting gap and a starting electrode for impressing the negative potential of said oscillograph charging capacitors upon the cathode of said oscillograph, means for charging said oscillograph capacitors, and a timing switch for controlling the time and sequence of operations of the charging means for said various capacitors and the operation of the starting electrode for the starting gap for said oscillograph.

4. An impulse generator comprising a plurality of groups of capacitors, one of said groups comprising a pair of capacitor units connected in series and the several groups being connected in multiple, means for impressing a charging voltage on the groups in multiple, a series discharge circuit for said groups the connected terminals of said pair being grounded and means for grounding the other terminal of one of the units of said pair during series discharge of said groups.

5. An impulse generator comprising a plurality of groups of capacitor units, one of said groups comprising a pair of units connected in series and the several groups being connected in multiple for charging, means for discharging said capacitor groups in series, a connection including an impedance between the connected terminals of said pair of units and ground, and an arcing gap between the end terminal and ground of the endmost capacitor unit in said series.

6. An impulse generator comprising a plurality of groups of capacitor units, means for charging the several groups in multiple, a series discharge circuit for said groups, the group at one end of said discharge circuit comprising a pair of units connected together in series, one unit of said pair being the endmost unit of said discharge circuit, an arcing gap between the endmost terminal of said endmost unit and ground, the other terminal of said endmost unit being connected to ground through an impedance.

7. An impulse generator comprising a plurality of groups of capacitor units, one of said groups comprising a pair of units connected in series, means for charging the several groups of capacitors in multiple, said means comprising a transformer, the secondary of which is connected at one end to ground, the other end of said secondary being connected through oppositely directed thermionic valves to the respective outer terminals of said pair, the connected terminals of said pair being connected through an impedance to ground, the outer terminal of one of the units of said pair being connected through an arcing gap to ground, and means for discharging said groups in series, the terminal of the capacitor unit connected through said arcing gap to ground being the endmost terminal of said series during discharge of said groups.

8. An impulse generator comprising a plurality of capacitor units, means for charging said capacitor units in multiple, means for discharging said capacitor units in series, and a time controlled device for controlling the operation of said charging and discharging means, said time controlled device being operable in recurrent cycles to reproduce duplicate cycles of operation of said generator.

9. An impulse generator comprising a plurality of capacitor units, means for charging said units in multiple, means for discharging said units in series, an indicator for indicating the characteristics of the discharge impulse of said capacitors and time controlled means for synchronizing and controlling the operation of said charging, discharging and indicating means.

10. An impulse generator comprising a plurality of capacitor units, means for charging said units in multiple, means for discharging said units in series, an oscillograph for indicating the character of the discharge impulse of said units, and a time controlled device for synchronizing and controlling the operations of said charging and discharging means and said oscillograph.

11. A impulse generator comprising a plurality of capacitor units, means for charging said units in multiple, means for discharging said units in series, an oscillograph for indicating the character of the discharge impulse, electric circuits for controlling the operation of said charging and discharging means and said impulse generator, mechanical switching mechanism for controlling said circuits, and a time controlled device for operating said switching mechanism.

12. An impulse generator comprising a plurality of capacitor units, means for charging said units in multiple, means for discharging said units in series, an oscillograph for detecting the character of the discharge impulse produced by said generator, capacitors for supplying energy to said oscillograph, a discharge circuit for said oscillograph capacitors, means for connecting said discharge circuit with the circuit of said impulse generator capacitors to discharge said impulse generator capacitors simultaneously with the discharge of said oscillograph capacitors, means for charging said oscillograph capacitors, and time controlled mechanism for synchronizing and timing the charging of said impulse generator capacitors and said oscillograph capacitors and for effecting discharge of said capacitors.

13. An impulse generator comprising a plurality of groups of capacitor units, one of said groups comprising a pair of units connected in series, means for charging the several groups in multiple, a series discharge circuit for said groups of capacitors comprising an arcing gap, the opposite terminals of which are connected to the outermost terminals of said pair of units, an electrode interposed between the terminals of said gap, means for impressing a charge on said interposed electrode to precipitate discharge across said gap, the intermediate terminals of said pair of units being grounded so that when said units are charged one terminal of said gap will be below and one above ground potential to facilitate discharge across said gap irrespective of the polarity of the impulse impressed upon said interposed electrode.

14. An impulse generator comprising a plurality of groups of capacitor units, one of said groups comprising a pair of units connected in series, means for charging the groups in multiple, a series discharge circuit for said groups comprising arcing gaps for connecting each group of units with the next adjacent group, the group comprising said pair of units being the endmost group in said series, one terminal of one of said arcing gaps being connected to one of the outer terminals of said pair, an impedance being connected between the other outer terminal of said pair of units and the other terminal of said arcing gap, an arcing gap between said last named terminal of said pair and ground, and impedance being connected between the intermediate terminals of said endmost pair of units and ground, a discharge electrode interposed between the terminals of the arcing gap connected to said pair of units, an oscillograph for detecting the character of the discharge impulse of said generator, capacitors for impressing a negative charge on the cathode of said oscillograph, and means for connecting said cathode with the discharge electrode of said generator so as to precipitate discharge of said impulse generator while said cathode is charged.

15. An impulse generator comprising a plurality of capacitors, a discharge circuit for said capacitors including series arcing gaps, means for precipitating discharge of said capacitors comprising a starting electrode associated with one of said arcing gaps, a cathode ray oscillograph for detecting the characteristics of the discharge impulse of said generator, oscillograph capacitor units for impressing a negative charge on the cathode of said oscillograph, said cathode being electrically connected with the starting electrode of said generator circuit, means for charging the capacitors of said generator circuit, means for charging said oscillograph capacitors, and automatic time controlled means for timing the charging of the capacitors of said generator circuit and of said oscillograph capacitors and for synchronizing therewith the application of a negative potential from said oscillograph capacitors on the cathode of said oscillograph and on the starting electrode of said generator circuit to precipitate a discharge of said generator circuit while said cathode is charged and subsequent to the charging of said generator capacitors.

16. An impulse generator comprising a plurality of pairs of capacitors, conductors connected to the outermost terminals of the several pairs of capacitors, means for impressing a voltage on said conductors for charging said capacitors, means for reversing the polarity of the voltage impressed on said conductors, a series discharge circuit for said pairs of capacitors comprising a plurality of arcing gaps having their terminals connected respectively to said conductors, one of said gaps being a starting gap for said discharge circuit, a starting electrode adjacent the terminals of said starting gap, means for grounding the connection between the capacitors of one of said pairs of capacitors so that one of the terminals of said starting gap will have a potential of one polarity with respect to ground and the other will have a potential of the other polarity with respect to ground irrespective of the order of the polarity of the voltage impressed on said conductors, a cathode ray oscillograph for detecting the nature of the discharge impulse of said generator, means for impressing a negative charge on the cathode of said oscillograph, said cathode being connected with the starting electrode of said starting gap, and automatic timing mechanism for synchronizing the charging of said cathode and starting electrode with the charging of the capacitors of said generator.

17. The combination with an impulse generator, of means for charging said generator for either positive or negative impulses, a series discharge circuit for said generator comprising arcing gaps including a starting gap, means for precipitating series discharge of said generator comprising a starting terminal adjacent the terminals of said starting gap, a ground connection for the circuit of said impulse generator so located that the terminals of said starting gap are at potentials of opposite polarity with respect to ground, a cathode ray oscillograph for detecting the nature of the discharge from said generator, means for impressing a negative potential on said starting terminal and the cathode of said oscillograph, and automatic means for synchronizing the time of charging of said impulse generator and the charging of said cathode and starting terminal with negative potential.

18. An impulse generator comprising a plurality of capacitor units, a circuit for discharging said units in series, means for charging said units in parallel to produce an impulse which may be either positive or negative with respect to earth potential, a starting electrode for precipitating discharge of said series circuit, said circuit being arranged to discharge when said starting electrode is charged negatively a proper amount, irrespective of the polarity of the discharge impulse, a cathode ray oscillograph for detecting the nature of discharge of said generator, the cathode of said oscillograph being connected to said starting electrode to synchronize the operation of said oscillograph and the discharge of said generator, capacitors for charging the cathode of said oscillograph and said starting electrode, and time controlled means for timing and synchronizing the charging of said last named capacitors, the charging of the capacitors of said generators and the operation of said starting gap from the negative charge of said cathode.

19. In combination an impulse generator having a plurality of groups of capacitor units, one of said groups comprising a pair of units connected in series, means for charging said groups of units in multiple, a series discharge circuit for said units having a starting gap the terminals of which are connected respectively with the outer terminals of said pair of units and a starting electrode adjacent both terminals of said starting gap for precipitating discharge of said units, the connected terminals of said pair of units capacitors being grounded to insure discharge of said starting gap whenever a charge of a given, proper value is imposed on said starting electrode, irrespective of the polarity of said impressed charge and irrespective of the order of polarity of the charge on said pairs of units.

20. An impulse generator comprising a plurality of pairs of capacitors, the capacitors of each pair being connected in series, conductors connected to the outermost terminals respectively of the several pairs of capacitors and connecting said pairs in multiple, means for impressing a voltage of either order of polarity on said conductors for charging said capacitors, a series discharge circuit for said capacitors comprising a plurality of arcing gaps having their terminals connected respectively to said conductors, one of said gaps being a starting gap, a starting electrode adjacent both terminals of said starting gap, and means for grounding the connected terminals of one of said pairs of capacitors so that when a charge of a given proper value is impressed on said starting electrode discharge of said starting gap will be precipitated irrespective of the polarity of the charge on said starting electrode and irrespective of the order of polarity of the voltage impressed on said conductors.

21. In combination an impulse generator having a plurality of groups of capacitor units, one of said groups comprising a pair of units connected in series, means for charging said groups of units in multiple, a series discharge circuit for said units having a starting gap, the terminals of said gap being connected respectively to the outer terminals of said pair of units, a starting electrode adjacent both terminals of said starting gap, and means for impressing negative charges on said starting electrode to precipitate discharge of said units, the connected terminals of said pair of units being grounded to insure discharge of said starting gap whenever a negative charge of a given proper value is impressed on said starting electrode irrespective of the order of polarity of the charge on said pairs of units.

22. In combination an impulse generator having a plurality of groups of capacitor units, one of said groups comprising a pair of capacitor units connected in series, means for charging said groups of units in multiple, a series discharge circuit for said units having a starting gap and a starting electrode adjacent both terminals of said starting gap, means for impressing negative charges on said starting electrode and means for synchronizing the charging of said groups of units with the impression of negative charges on said starting electrode, the connected terminals of said pair of units being grounded to insure discharge of said starting gap when ever a negative charge of a given proper value is impressed on said starting electrode irrespective of the order of polarity of the charge on said pairs of units.

HAROLD L. RORDEN.